United States Patent
Ringger et al.

(10) Patent No.: US 6,606,597 B1
(45) Date of Patent: Aug. 12, 2003

(54) AUGMENTED-WORD LANGUAGE MODEL

(75) Inventors: Eric K. Ringger, Issaquah, WA (US); Lucian Galescu, Rochester, NY (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 09/657,686

(22) Filed: Sep. 8, 2000

(51) Int. Cl.$^7$ .............................................. G10L 13/00
(52) U.S. Cl. ........................ 704/270; 704/275; 704/4; 707/14
(58) Field of Search ................ 704/257, 270, 704/275; 707/4

(56) References Cited

U.S. PATENT DOCUMENTS

| | | | | |
|---|---|---|---|---|
| 5,623,609 A | * | 4/1997 | Kaye et al. ..................... | 704/1 |
| 6,021,384 A | * | 2/2000 | Gorin et al. .................... | 704/1 |
| 6,044,337 A | * | 3/2000 | Gorin et al. .................... | 704/1 |
| 6,092,034 A | * | 7/2000 | McCarley et al. .............. | 704/2 |
| 6,311,152 B1 | * | 10/2001 | Bai et al. ........................ | 704/9 |
| 6,334,102 B1 | * | 12/2001 | Lewis et al. ................. | 704/255 |
| 6,385,579 B1 | * | 5/2002 | Padmanabhan et al. ..... | 704/243 |
| 6,411,932 B1 | * | 6/2002 | Molnar et al. .............. | 704/260 |
| 6,415,248 B1 | * | 7/2002 | Bangalore et al. ............. | 704/1 |
| 6,418,431 B1 | | 7/2002 | Mahajan et al. ................ | 707/4 |

FOREIGN PATENT DOCUMENTS

WO    WO 99/50830    7/1999

OTHER PUBLICATIONS

"POS Tagging versus Classes in Language Modeling" by Peter A. Heeman, presented at the Sixth Workshop on Very Large Corpora, (Aug. 1998).

* cited by examiner

*Primary Examiner*—Susan McFadden
(74) *Attorney, Agent, or Firm*—Joseph R. Kelly; Westman, Champlin & Kelly, P.A.

(57) ABSTRACT

A language model comprising a plurality of augmented-word n-grams and probabilities corresponding to such n-grams. Each n-gram is comprised of a sequence of augmented words. Each augmented word is comprised of the orthographic representation of the word together with a tag representing lexical information regarding the word, such as syntactic or semantic information. Also disclosed are a method of building such a language model, a method of automatically recognizing speech using the language model and a speech recognition system that employs the language model.

15 Claims, 6 Drawing Sheets

AUGMENTED-WORD LANGUAGE MODEL

FIELD OF THE INVENTION

The present invention relates generally to language models used in automatic systems to represent word sequences and their probability of occurrence. More particularly, the present invention relates to a language model that includes augmented words that are augmented with lexical (for example, linguistic) information regarding the corresponding word.

BACKGROUND OF THE INVENTION

Language models are employed in various automatic systems, such as speech recognition systems, handwriting recognition systems, spelling correction systems, and other word-oriented pattern recognition systems. A language model represents word sequences and the probability of that sequence occurring in a given context. Although the systems and methods of the present invention are applicable to any word-oriented pattern recognition problem, the invention will be discussed herein with respect to speech recognition, as that is a common application of language models.

Speech recognition systems employ models of typical acoustic patterns and of typical word patterns in order to determine a word-by-word transcript of a given acoustic utterance. The word-patterns used by a speech recognition system are collectively referred to as a language model. The acoustic patterns are referred to as an acoustic model.

Many current speech recognition systems use language models that are statistical in nature. Such language models are typically constructed using known techniques from a large amount of textual training data that is presented to a language model builder. An n-gram language model may use known statistical "smoothing" techniques for assigning probabilities to n-grams that were not seen in the construction/training process. In using these techniques, the language models estimate the probability that a word $w_n$ will follow a sequence of words $w_1, w_2, \ldots w_{n-1}$. These probability values collectively form the n-gram language model.

There are many known methods that can be used to estimate these probability values from a large text corpus presented to the language model builder, and the exact methods for computing these probabilities are not of importance to the present invention. Suffice it to say that the language model plays an important role in improving the accuracy and speed of the recognition process by allowing the recognizer to use information about the likelihood, grammatical permissibility, or meaningfulness, of sequences of words in the language. In addition, language models that capture more information about the language lead to faster and more accurate speech recognition systems.

Current approaches to language modeling consider words to be equivalent to their orthographic (written) form. However, in many cases, the orthographic form is not sufficient for drawing distinctions that have an impact on the way the word is spoken. Often, the meaning of a word, including its syntactic role, determines its pronunciation. The pronunciations used in the following examples employ a phonetic notation known as the "ARPABET." The numbers attached to vocalic phonemes indicate syllabic stress. A favorite example is the word "object". The syntactic role (in this case, part of speech) for "object" can be noun or verb:

| OBJECT/N | /AA1 B JH EH0 K T/ |
| OBJECT/V | /AH0 B JH EH1 K T/ |

Accordingly, the pronunciation of the word depends on the syntactic role. In the case of the noun "object," the stress is on the first syllable, and for the verb "object," the stress is on the second syllable.

Another favorite example is the word "wind". Again, the syntactic role (part of speech again here) determines the pronunciation:

| WIND/N | /W IH N D/ |
| WIND/V | /W AH IY N D/ |

A final favorite example is the word "read". Here the syntactic role that affects pronunciation is the tense of the verb (present or past):

| READ/V + PRES | /R IY D/ |
| READ/V + PAST | /R EH D/ |

Words with different syntactic properties, such as those in the above examples, tend to appear in different contexts. Thus, statistical language models that do not distinguish between words with identical orthography but different, senses or syntactic roles will model those words and their contexts poorly.

Class-based language models deal with training data sparseness by first grouping words into classes and then using these classes as the basis for computing n-gram probabilities. Classes can be determined either by automatic clustering, or they can be domain-specific semantic categories or syntactic categories (e.g., parts of speech (POS)). Although the latter approach has the advantage of capturing some linguistic information in the language model, using syntactic classes in traditional formulations has a major drawback: the POS tags hide too much of the specific lexical information needed for predicting the next word.

An alternative approach has been proposed in which part-of-speech (POS) tags are viewed as part of the output of the speech recognizer, rather than intermediate objects, as in class-based approaches. However, in this approach the words and tags are viewed as being produced by separate processes.

The present invention addresses to these and other problems and offers other advantages over the prior art.

SUMMARY OF THE INVENTION

The present invention relates to a speech recognition system (or any other word-oriented pattern recognition system) that employs a language model that includes augmented words that are augmented with lexical information regarding the corresponding word.

One embodiment of the present invention is directed to a computer-readable medium having stored thereon a data structure that includes a first data field, optional previous-word data fields, and a probability data field. The first data field contains data representing a first word and includes an orthography subfield and a tag subfield. The orthography subfield contains data representing the orthographic representation (written form) of the word. The tag subfield contains data representing a tag that encodes lexical information regarding the word. Each of the previous-word data fields contains data representing a potentially preceding word and includes an orthography subfield and a tag subfield. The orthography subfield contains data representing the orthographic representation of the word. The tag subfield contains data representing a tag that encodes lexical information regarding the word. The probability data field contains data representing the probability of the first word and tag occurring (possibly after the optional preceding words and accompanying tags) in a word sequence, which may comprise a sentence or a conversational utterance.

Another embodiment of the present invention is directed to a method of building a language model. Pursuant to this embodiment, a training corpus comprising a body of text is received. Words in the training corpus are each augmented with a tag encoding lexical information regarding the corresponding word. A plurality of sequences of n augmented words are selected, n being a positive integer. Each selected sequence includes a sub-sequence made up of the first n−1 augmented words of the selected sequence. For each selected sequence of n augmented words, the method computes the probability that, given an occurrence of the sub-sequence in a block of text, the immediately following word will be the nth augmented word of the selected.

Another embodiment of the invention is directed to a method of automatically recognizing speech. Pursuant to this embodiment, a language model having a plurality of n-grams is provided. Each n-gram includes a sequence of n augmented words. Each augmented word includes a word and a tag encoding lexical information regarding the word. The language model further includes a probability indicator for each n-gram. Each probability indicator is indicative of a probability that, given an occurrence of the first n−1 words of the corresponding n-gram in a block of text, the immediately following word in the block of text will be the nth word of the n-gram. The speech recognition process hypothesizes many sequences of n−1 augmented words. The frontier (final n−1 augmented words) of each hypothesized sequence is compared to the first n−1 augmented words of a selected n-gram. If the frontier of the hypothesis matches the first n−1 augmented words of the selected n-gram, then the probability indicator corresponding to the selected n-gram is accessed to determine the probability that the nth augmented word of the selected n-gram is the augmented word immediately following the hypothesized sequence covering the incoming acoustic utterance.

Another embodiment of the present invention is directed to a speech recognition system that includes a computer readable storage medium having data representing a language model stored thereon and a decoder. The language model includes a plurality of n-grams made up of a sequence of n augmented words. Each augmented word includes a word and a tag encoding lexical information regarding the word. The language model further includes a probability indicator corresponding to each n-gram. Each probability indicator is indicative of a probability that, given an occurrence of the first n−1 augmented words of the corresponding n-gram, the immediately following word in the block of text will be the nth augmented word of the n-gram. The decoder is adapted to hypothesize a sequence of words. The decoder is further adapted to access the storage medium and to compare the frontier (last n−1 augmented words) of the hypothesized sequence to the first n−1 augmented words of a selected n-gram. If the hypothesized sequence matches the first n−1 words of a selected n-gram, the probability indicator corresponding to the selected n-gram is accessed to determine the probability that the word immediately following the hypothesized sequence will be the nth augmented word of the selected n-gram.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
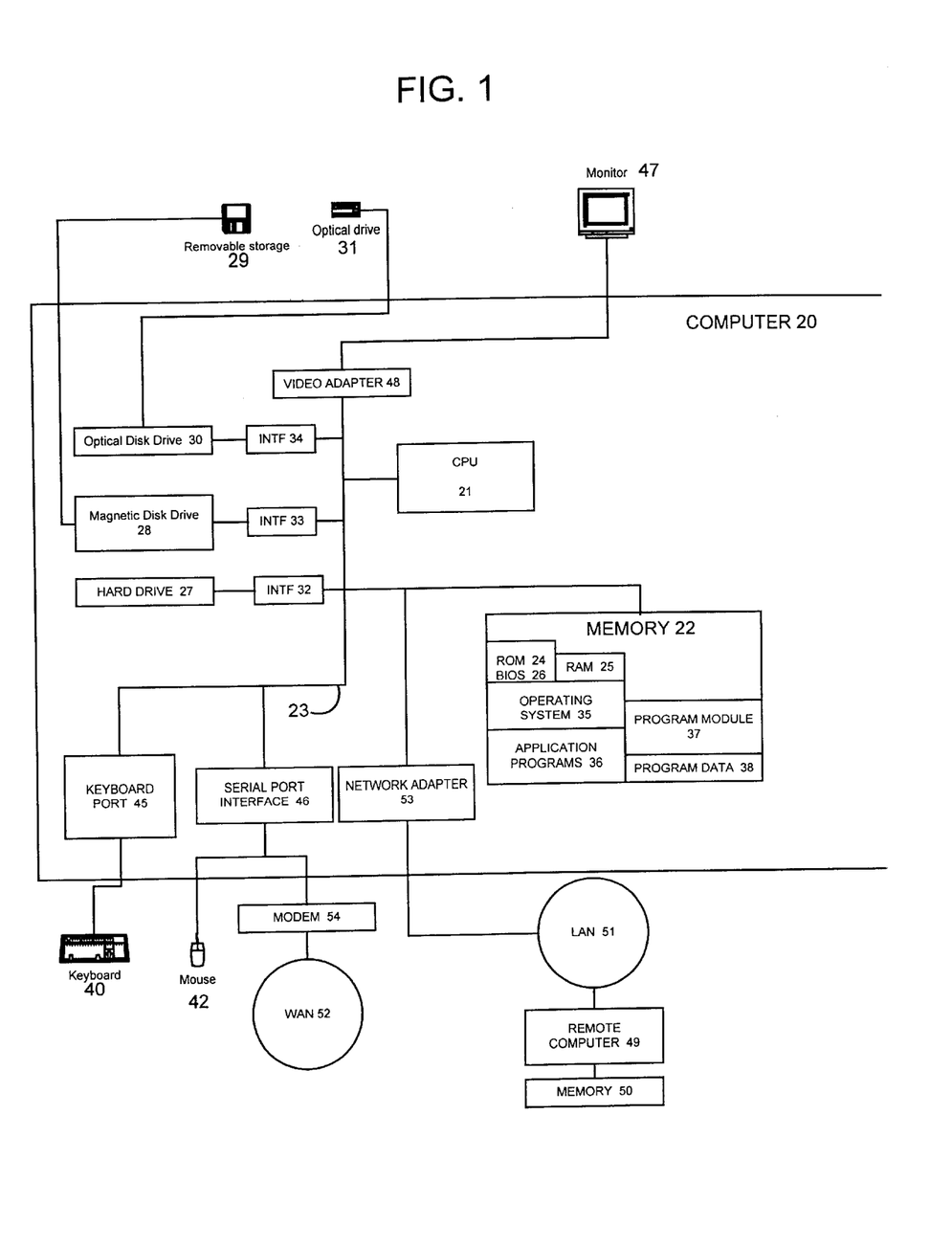
FIG. 1 is an exemplary computer system for implementing the present invention.

Prior to a detailed discussion of the present invention, an overview of an operating environment may be helpful. FIG. 1 and the related discussion provide a brief, general description of a suitable computing environment in which the invention can be implemented. Although not required, the invention will be described, at least in part, in the general context of computer-executable instructions, such as program modules, being executed by a personal computer. Generally, program modules include Routine programs, objects, components, data structures, etc. that perform particular tasks or implement particular abstract data types. Tasks performed by the programs and modules are described below and with the aid of block diagrams and flow charts. Those skilled in the art can implement the descriptions, block diagrams and flow charts as processor executable instructions, which can be written on any form of a computer readable medium. In addition, those skilled in the art will appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 can be any of several types of bus structures including a memory bus or memory controller, a peripheral bus, and a local bus using any of a variety of bus architectures. The system memory includes read only memory (ROM) 24 and a random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media, which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 29, optical disk 31, ROM 24 or RAM 25, including an operating system 35, one or more application programs 36, other program modules 37, and program data 38. A user can enter commands and information into the personal computer 20 through input devices such as a keyboard 40 or a pointing device 42. Other input devices (not shown) can include a handwriting tablet, microphone, joystick, game pad, satellite dish, scanner, or the like. These and other input devices are often connected to the processing unit 21 through a serial port interface 46 that is coupled to the system bus 23, but can be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers typically include other peripheral output devices such as speakers and a printer (not shown).

The personal computer 20 can operate in a networked environment using logic connections to one or more remote computers, such as remote computer 49. The remote computer 49 can be another personal computer, a server, a router, a network PC, a peer device or other network node, and typically includes many or all of the elements described above relative to the personal computer 20 although only a memory storage device 50 has been illustrated in FIG. 1. The network connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the local area network 51 through a network-interface or adapter 53. When used in a WAN networking environment (such as the Internet), the personal computer 20 typically includes a modem 54 or other means for establishing communications over the wide area network 52. The modem 54, which can be internal or external, is connected to the system bus 23 via the serial port interface 46. In a network environment, program modules depicted relative to the personal computer 20, or portions thereof, can be stored in the remote memory storage devices. As appreciated by those skilled in the art, the network connections shown are exemplary and other means of establishing a communications link between the computers can be used.

Language models are employed in various automatic systems, such as speech recognition systems, handwriting recognition systems, spelling correction systems, and other word-oriented pattern recognition systems. A language model represents word sequences and the probability of a given sequence occurring in a given context. Although the systems and methods of the present invention are applicable to any word-oriented pattern recognition problem, the invention will be discussed herein with respect to speech recognition, as that is a common application of language models.

Figure 2:
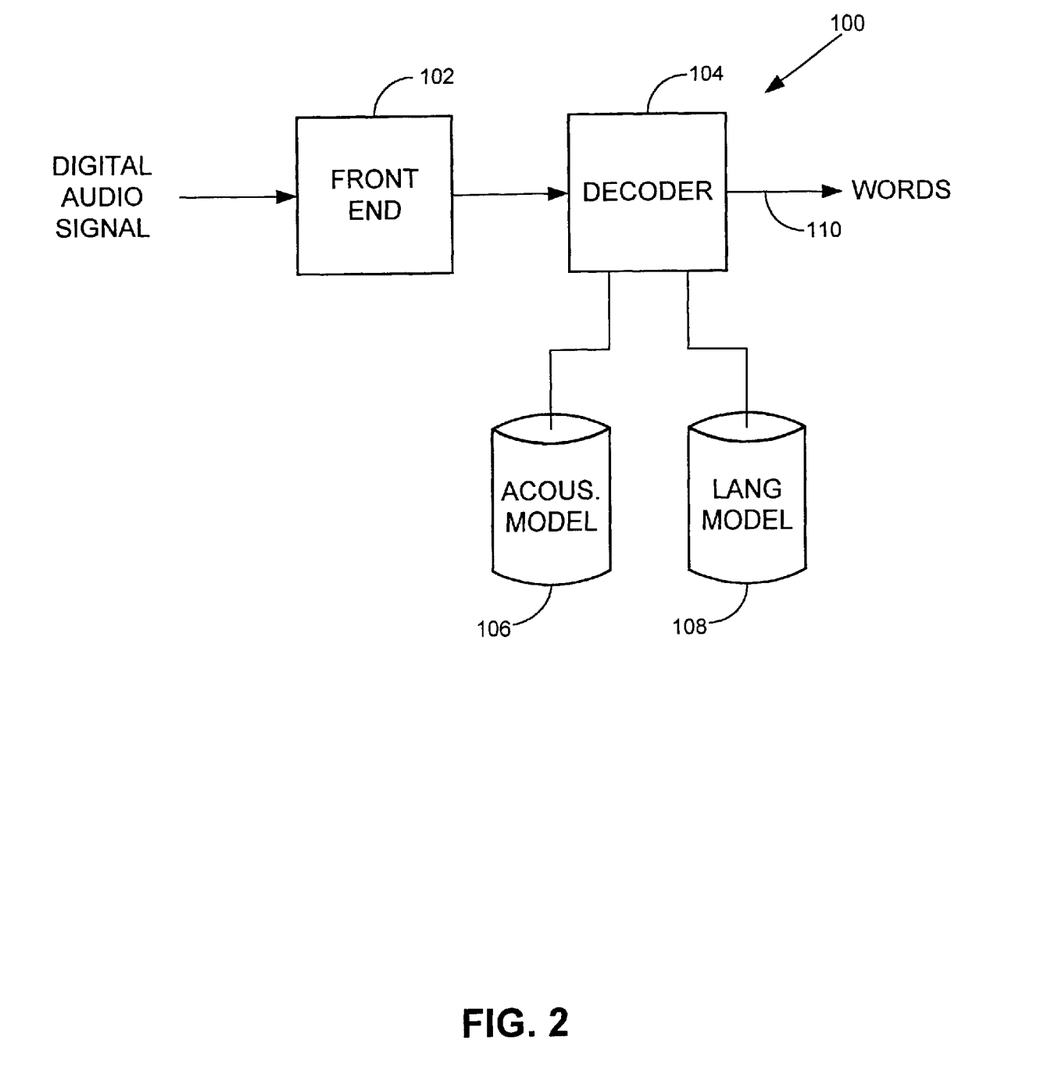
FIG. 2 is a block diagram showing a general representation of a speech recognition system according to an illustrative embodiment of the present invention.

FIG. 2 is a block diagram giving a general representation of a speech recognition system 100, also known as a speech recognizer according to an illustrative embodiment of the present invention. Front end 102 receives a digital audio signal and computes spectral parameters representative of the received audio signal and provides them to decoder 104. Decoder 104 has access to acoustic model 106 and language model 108, which are illustratively stored on a computer readable storage medium.

Acoustic model 106 contains information that helps the decoder hypothesize what words have been spoken based on the spectral parameters provided by front end 102 Acoustic model, 106 illustratively includes means for hypothesizing a series of phonemes based on the spectral parameters produced by front end 102. A phoneme is the smallest phonetic unit in a language that is capable of conveying a distinction in meaning, as the m of mat and the b of bat in English. The English language contains roughly 50 distinct phonemes. In an illustrative embodiment, this means involves the use of a dictionary and hidden markov models. Acoustic model 106 illustratively includes a dictionary (lexicon) of words, and their corresponding phonetic pronunciation. The pronunciations in the dictionary illustratively contain an indicator of the probability that a given phoneme sequence will occur together to form a word. Acoustic model 106 may also illustratively include information regarding the likelihood of distinct phonemes, possibly occurring in the context of other phonemes. One illustrative context is the so-called "triphone," which is a distinct phoneme in the context of another distinct phoneme on the left and a third distinct phoneme the right. The contents of the acoustic model in concert help the decoder 104 to predict what words are represented by the computed spectral parameters. In an illustrative embodiment, at any given point in the recognition process, decoder 104 uses acoustic model 106 to identify likely phonemes and therefore word hypotheses represented by the spectral parameters.

Language model 108 specifies how, and in what frequencies, words occur together. An n-gram language model estimates the probability that a word $w_n$ will follow a sequence of words $w_1, w_2, \ldots w_{n-1}$. These probability values collectively form the n-gram language model. Decoder 104 utilizes these probabilities to choose among the best word-sequence hypotheses, as identified using acoustic model 106, to obtain the most likely word or word sequence represented by the spectral parameters. This most likely hypothesis is output from decoder 104 at output 110.

Formally, the task of an automatic speech recognition system is to take an acoustic input and to derive from it the most likely string of words given the acoustic evidence. That is, it should decide in favor of the word string W* satisfying the following:

$$W^* = \underset{W}{\operatorname{argmax}} P(W \mid A) = \underset{W}{\operatorname{argmax}} P(W)P(A \mid W)$$

where A is the acoustic evidence and W is any string of words. The language model P(W) is the mechanism that computes the prior probability of any word sequence $W=w_1, w_2, \ldots, w_N = w_{1,N}$:

$$P(w_{1,N}) = \prod_{i=1}^{N} P(w_i \mid w_{1,i-1})$$

Due to the sparseness of training data, one cannot reliably estimate the probability distribution for contexts of arbitrary length. N-gram models known in the art provide the solution of restricting the contexts $w_{1,i-1}$ for predicting the next word, $w_i$, to the last n−1 words. One can also mix in lower order models for smoothing when there is not enough data to support larger contexts, by using either interpolation, or a back-off approach.

Class-based models known in the art take a further step in trying to deal with the data sparseness by first grouping words into classes, and then using these classes as the basis for computing n-gram probabilities. The probability of a word sequence becomes:

$$P(w_{1,n}) = \sum_{C1,C2,\ldots,C_N} \prod_{i=1}^{N} P(c_1 \mid c_{1,i-1}) P(w_i \mid c_i)$$

where $c_l$ is the class associated with the word $w_l$, for all i. Classes can be determined either by automatic clustering, or they can be domain-specific semantic categories, or syntactic categories (POS). Although the latter approach has the advantage of capturing some linguistic information in the language model, using POS classes in the above formulation has a major drawback: the POS tags remove too much of the specific lexical information needed for predicting the next word. POS-based language models can bring some improvement only by interpolation with word-based models.

Furthermore, significant improvements have been obtained in the prior art by grouping words into multi-word units, commonly called phrases, and including them in the base vocabulary (i.e., lexicalizing them); e.g., "New_York_City". The grouping may be done either manually or automatically.

The most common measure of the effectiveness of a language model is the test set perplexity, which is an estimate of how well the language model is able to predict the next word in a test corpus, in terms of the number of alternatives that need to be considered at each point. The perplexity of a test set $W=w_{1,N}$ relative to a language model P is defined as $$PP(P;w_{1,N}) = [P(w_{1,N})]^{-1/N}$$

An alternative formulation of the speech recognition problem has been presented in the prior art, in which POS tags are viewed as part of the output of the speech recognizer. The task of the speech recognizer becomes determining $$W^*, T^* = \underset{W,T}{\operatorname{argmax}} P(W, T \mid A) = \underset{W,T}{\operatorname{argmax}} P(W, T)P(A \mid W, T)$$

where T is the sequence of POS tags associated with the word sequence W. The acoustic model, P(A|W,T), is approximated as P(A|W). The language model, P(W,T), accounts for both the sequence of words and the assignment of POS tags to those words, and can be rewritten as $$P(w_{1,N}, t_{1,N}) = \prod_{i=1}^{N} P(w_1, t_i \mid w_{1,i-1}, t_{1,i-1})$$

This model can then be factored into two probability distributions:

$$P(w_i t_i \mid w_{1,i-1}, t_{1,i}) = P(w_i \mid w_{1,i-1}, t_{1,i}) P(t_i \mid w_{1,i-1}, t_{1,i-1})$$

Note that this approach generalizes the class-based model. That is, this approach makes the following assumptions:

$$P(w_i \mid w_{1,i-1}, t_{1,i}) = P(w_i \mid t_i)$$

$$P(t_i \mid w_{1,i-1}, t_{1,i-1}) = P(t_i \mid t_{1,i-1})$$

Thus, this prior art approach views the words and their tags as being produced independently by separate processes. Thus, two separate probabilities are determined, one for the word and one for the part-of-speech tag. These two probabilities are then multiplied to determine a probability for a given word/tag combination.

In contrast with this prior art approach, the present invention does not view the words and their, tags as being produced by separate processes. Instead, according to the present invention, the lexicon of words and the language model are comprised of augmented words that consist of the orthographic (written) form of the word plus a tag that encodes additional linguistic information about the word. Thus the words and tags are intimately connected in the language model and in the lexicon. The additional information can include tags that are indicative of semantic information, such as a definition, or syntactic information, such as a part of speech, or both. For example, in an embodiment wherein the augmented words include part-of-speech (POS) tags, the lexicon would include an entry for the noun "object," as well as an entry for the verb "object." Each of these entries would include the orthographic form of the word, "object," plus a tag indicating the part of speech, noun and verb, respectively. Thus, the probability of a given augmented word is estimated directly:

$$P(w_i, t_i \mid w_{1,i-1}, t_{1,i-1}) = P(<w,t>_i \mid <w,t>_{1,i-1})$$

To estimate the probability distribution, first the words in the training corpus are augmented. For example, syntactic categories can be illustratively obtained using a POS tagger. Using a natural language understanding system, the words in the training corpus can also be augmented illustratively with semantic information.

As with the prior art models based on bare orthographic word forms, a maximum likelihood estimation of the parameters of the language model (a probability distribution) can be obtained from the annotated corpus n-gram statistics.

Thus, referring again to FIG. 2, speech recognition system 100 includes computer readable storage medium 108 having data representing a language model stored thereon. The language model 108 includes a plurality of n-grams made up of a sequence of n augmented words. Each augmented word includes a word and a tag encoding lexical information regarding the word. The language model 108 further includes a probability indicator corresponding to each n-gram. Each probability indicator is indicative of a probability that, given an occurrence of the first n−1 augmented words of the corresponding n-gram in a block of text, the immediately following word in the block of text will be the nth augmented word of the n-gram. Decoder 104 is adapted to hypothesize a sequence of n−1 augmented words. Decoder 104 is further adapted to access 108 storage medium and to compare the frontier (last n−1 augmented words) of a hypothesized sequence to the first n−1 augmented words of a selected n-gram. If the hypothesized sequence matches the first n−1 words of a selected n-gram, the probability indicator corresponding to the selected n-gram is accessed to determine the probability that the augmented word immediately following the hypothesized sequence will be the nth augmented word of the selected n-gram.

In an illustrative embodiment, decoder 104 compares the hypothesized sequence to a plurality of augmented word n-grams and accesses the probability indicator corresponding to each n-gram whose first n−1 augmented words match the frontier (last n−1 augmented words) of the hypothesized sequence to determine the probability that the next augmented word in the hypothesized sequence will be the nth augmented word of that n-gram. Decoder 104 then uses the accessed probability indicators to determine a likely augmented word to follow the hypothesized sequence. In an illustrative embodiment, decoder 104 compares the probability indicators corresponding to the plurality of selected n-grams to rank the augmented words, among the respective nth augmented words of the selected n-grams, according to the likelihood of following the hypothesized sequence. Decoder 104 then illustratively extends the hypothesized sequence to form additional augmented word sequence hypotheses. There is illustratively one new hypothesis for each augmented word identified by consulting the n-grams. The score of the new hypothesis is a combination of the shorter hypothesis and the probability indicator from the language model. The speech recognizer 104 then repeats the process described above for each new augmented word sequence hypothesis. Thus, for each new hypothesis, decoder 104 compares the frontier of the new hypothesis sequence to the first n−1 augmented words of a selected n-gram and accesses the probability indicator corresponding to the selected n-gram if the new sequence of n−1 augmented words matches the first n−1 augmented words of the second selected n-gram. This process is repeated further to arrive at many full-length hypotheses for a given acoustic utterance. Finally, in an illustrative embodiment, decoder 104 chooses the best-scoring complete hypothesis according to its accumulated score.

Figure 3:
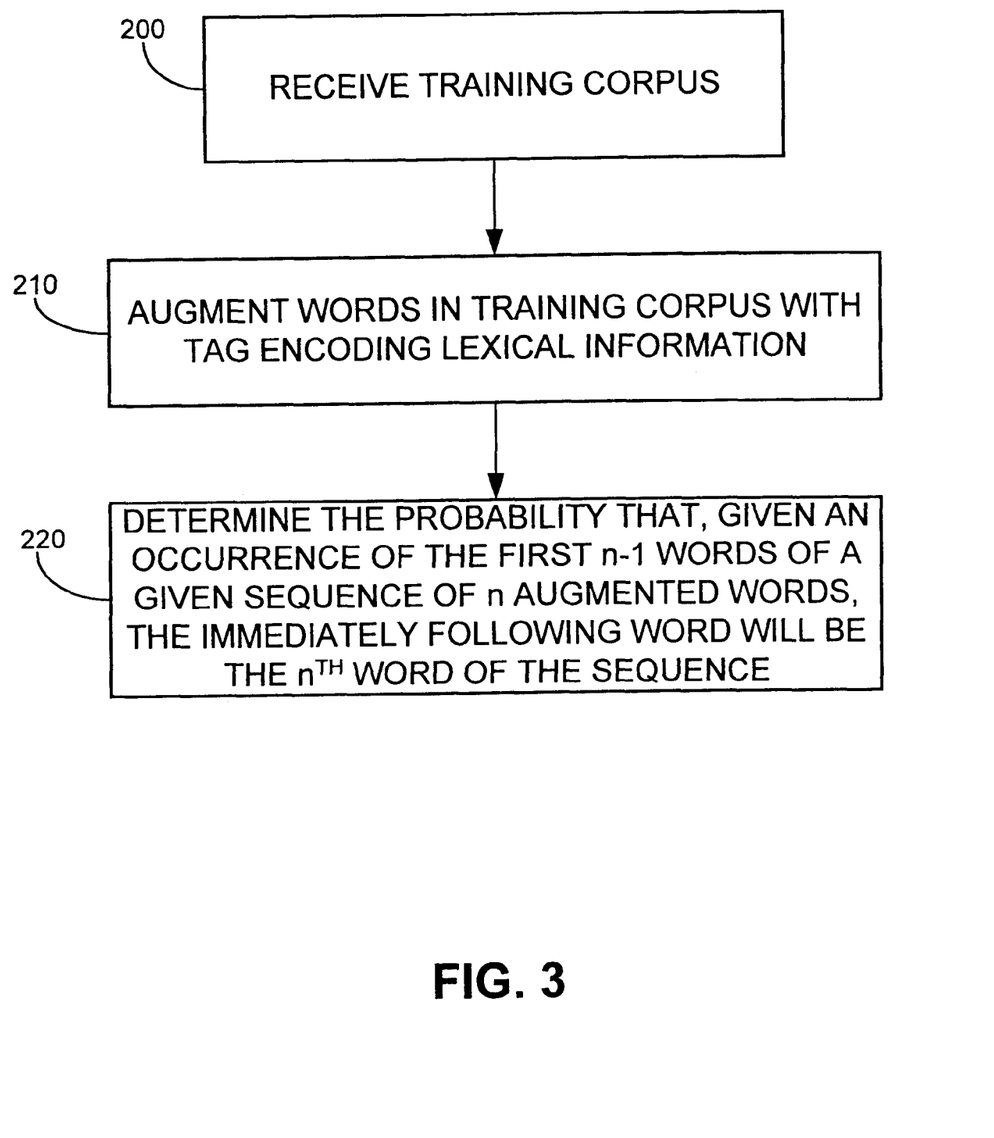
FIG. 3 is a flow chart representing a method of building a language, model according to the present invention.

FIG. 3 is a flow chart representing a method of building a language model according to the present invention. At step 200, a training corpus comprising a body of text is received. The training corpus is a large body of text that is representative of language that is representative of the kind of language to be spoken to speech recognition system 100. For example, multiple issues (say, one year's worth) of a newspaper or other periodical publication, such as the *Wall Street Journal*, can be used as the training corpus. At step 210, words in the training corpus are augmented with a tag encoding lexical information regarding the corresponding word. As discussed above, the lexical information can include, for example, semantic information, such as a definition, or syntactic information, such as a part of speech, or both. For example, in one embodiment, the noun "object" would be augmented with information indicating that it is a noun, while the verb "object" would be augmented with information indicating that it is a verb. The noun "object" has multiple meanings. Thus, in a further illustrative embodiment, each semantic version of the noun "object" is augmented with information indicating the definition of the word.

A plurality of sequences of n augmented words are selected, n being a positive integer (typically 1, 2, 3, 4, or 5 in the state of the art). Such a sequence is commonly referred to as an n-gram. For example, a uni-gram is such a sequence of a single word. A bi-gram is such a sequence of two words, while a tri-gram is such a sequence of three words. By way of illustration, using a bi-gram model, a bi-gram would be maintained for the phrase "object(verb) to(preposition)." A bi-gram would also be maintained for the phrase "object (noun) to(preposition)." Each selected sequence, or n-gram, includes a sub-sequence made up of the first n−1 augmented words of the n-gram. For each n-gram, the probability that, given an occurrence of the sub-sequence in a given block of text (or a speech recognition hypothesis), the immediately following word will be the nth augmented word of the selected sequence is determined, as shown at step 220. For example, for the bi-gram "object(verb) to(preposition)," the probability that, given an occurrence of the word "object (verb)" in a block of text, the immediately following word will be "to(preposition)" is determined. Similarly, for the bi-gram "object(noun) to(preposition)," the probability that, given an occurrence of the word "object(noun)" in a block of text, the immediately following word will be "to (preposition)" is determined. The n-grams and their corresponding probabilities are stored as part of language model 108. Note that the probability that "to" would follow the verb "object" is different than the probability that "to" would follow the noun "object." Therefore, the use of augmented words in the language model results in a more accurate language model than those in which no distinction is made between the noun "object" and the verb "object." The augmented-word language model is also more accurate than prior art approaches that treat the word and the tag as being produced by separate, independent processes.

In an illustrative embodiment, step 220 of determining the probability involves determining the number of times the selected sequence occurs in the training corpus and determining the number of times that the sub-sequence occurs in the training corpus. The probability is then calculated based on these numbers.

Figure 4:
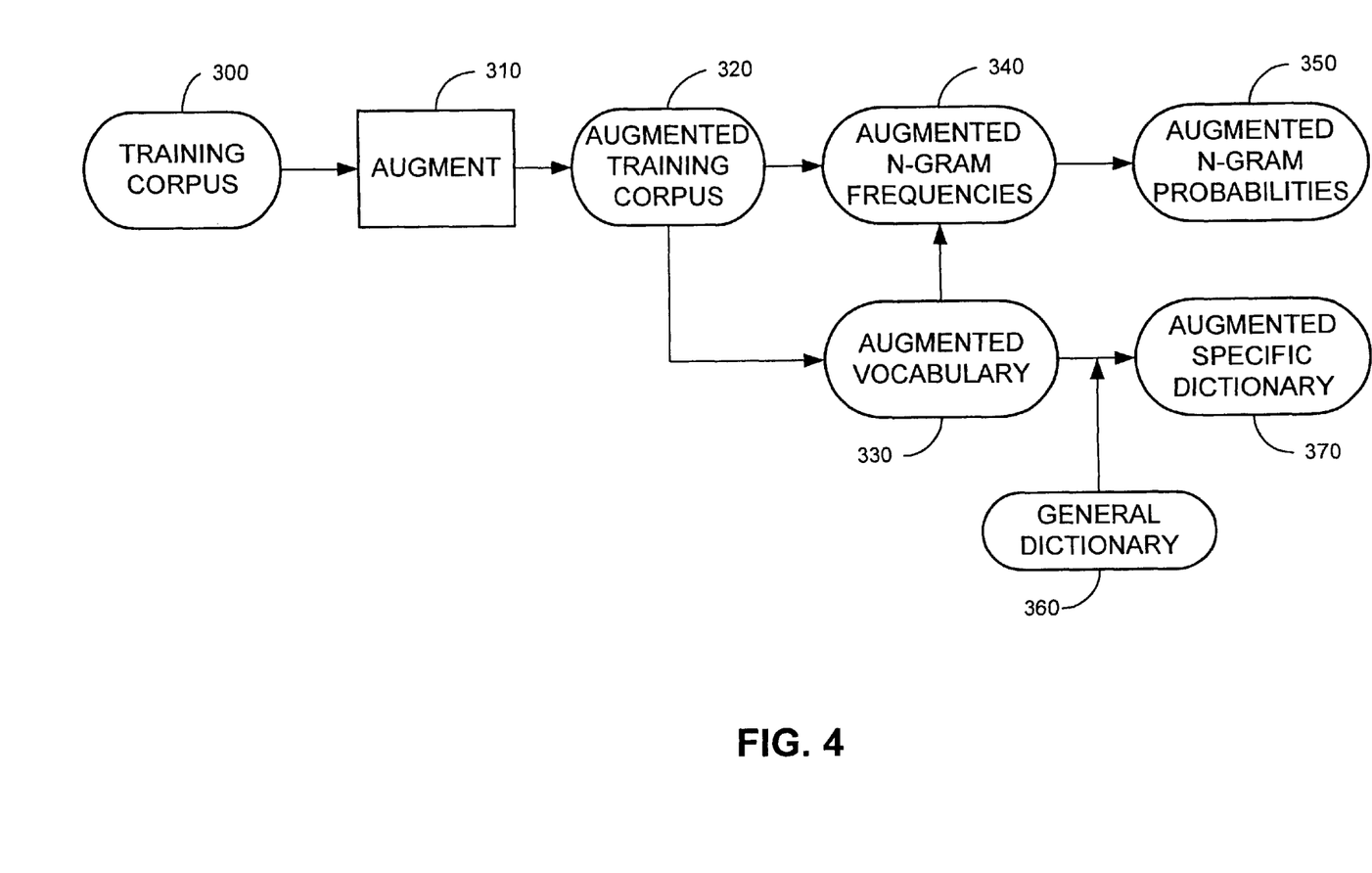
FIG. 4 is a flowchart representing a method of building a language model according to an illustrative embodiment of the present invention.

FIG. 4 is a flowchart representing a method of building a language model according to an illustrative embodiment of the present invention. Training corpus 300 is augmented at block 310, resulting in augmented training corpus 320 that is comprised of augmented words. Each augmented word is comprised of the word itself, that is, the orthographic representation of the word, together with a tag that contains lexical information about the word. Augmented training corpus 320 is used to produce augmented vocabulary 330, which is a list of the augmented words found in augmented training corpus 320. Augmented training corpus 320 is then used to determine the occurrence frequency of selected n-grams formed of augmented words from augmented vocabulary 320, resulting in augmented n-gram frequencies 340. Augmented n-gram frequencies. 340 are then used to determine augmented n-gram probabilities 350, or the probability that, given an occurrence of the first n−1 augmented words of a given n-gram, the immediately following word will be the nth augmented word of the n-gram. Augmented vocabulary 330 is also used in conjunction with a general dictionary 360 to compile augmented specific dictionary 370, which is comprised of the augmented words (augmentations may include definitions, a syntactic information, semantic information, and/or any other augmentation deemed relevant) in augmented vocabulary 330 along with pronunciations of the words.

Figure 5:
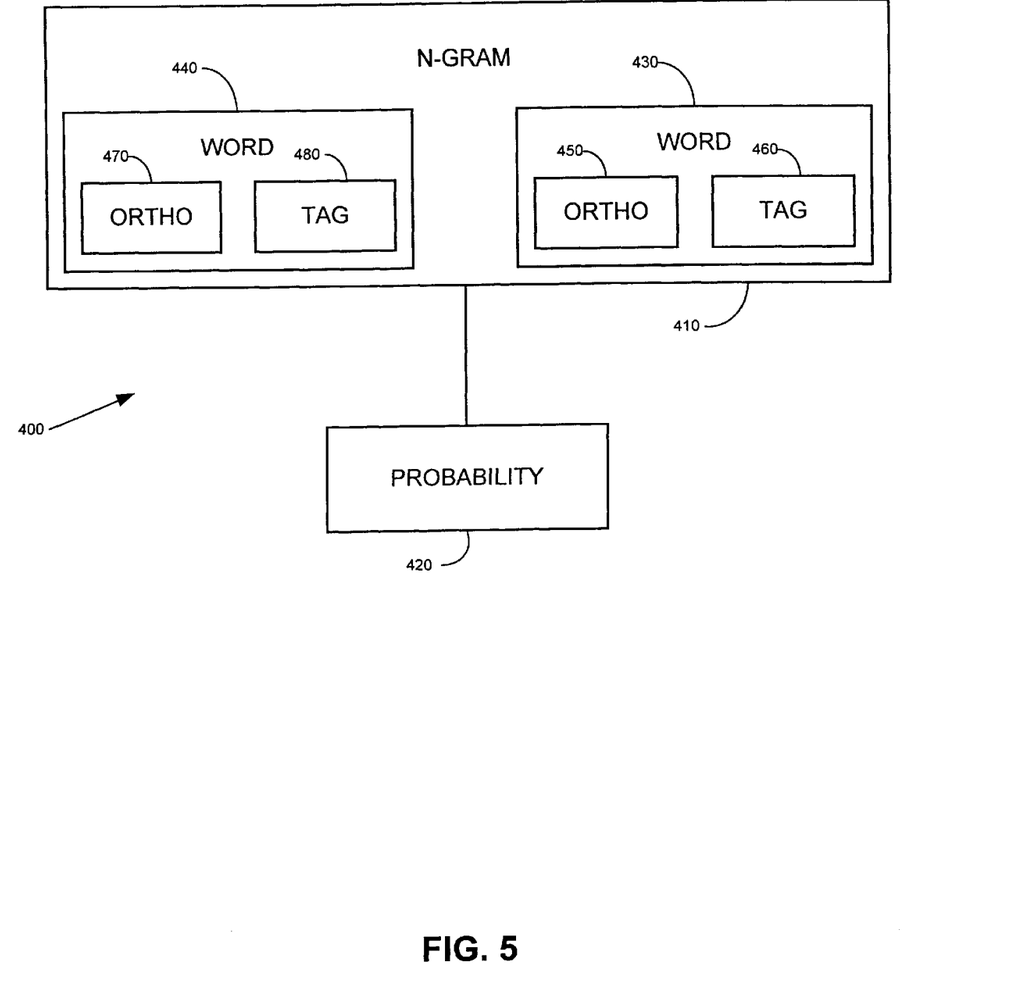
FIG. 5 is a block diagram of an augmented word language model according to an illustrative embodiment of the present invention.

The above-described method results in an augmented-word language model that comprises a plurality of augmented-word n-grams 410, each having an associated probability 420. FIG. 5 is a block diagram representing an n-gram/probability pair 400 according to an illustrative embodiment of the present invention. An augmented-word language model according to the present invention illustratively includes a plurality of n-gram/probability data structures 400. Data structure 400 includes a first word 430 optional preceding words 440, and a probability 420. Word 430 (the nth word of n-gram 430) includes an orthography portion 450 and a tag portion 460. The orthography portion 450 represents the orthographic representation of the word 430. The tag portion 460 encodes lexical information regarding the word 430. If the language model uses a bi-gram model, as in FIG. 5, there will be one potentially preceding word 440. If a tri-gram model is employed, there will be two potentially preceding words 440, and so on. Each of the potentially preceding words 440 includes an orthography portion 470 and a tag portion 480, similarly to first word 430. Probability 420 represents the probability of the first word 430 occurring (after any potentially preceding word(s) 440) in a word sequence.

Thus, one embodiment of the present invention is directed to a computer-readable medium 108 having stored thereon a data structure 400 that includes a first data field, possible previous word data field(s), and a probability data field. The first data field contains data representing a first word 430 (the nth word of a given n-gram) and includes an orthography subfield and a tag subfield. The orthography subfield contains data representing the orthographic representation 450 of the word 430. The tag subfield contains data representing a tag 460 that encodes lexical information regarding the word. If the language model uses a bi-gram model, there will be one previous-word data field, if it uses a tri-gram model, there will be two previous word data fields, and so on. Each of the previous-word data fields contains data representing a potentially preceding word 440 and includes an orthography subfield 470 and a tag subfield 480. The probability data field contains data representing the probability 420 of the first word 430 occurring after any preceding word(s) 440 in a word sequence.

Figure 6:
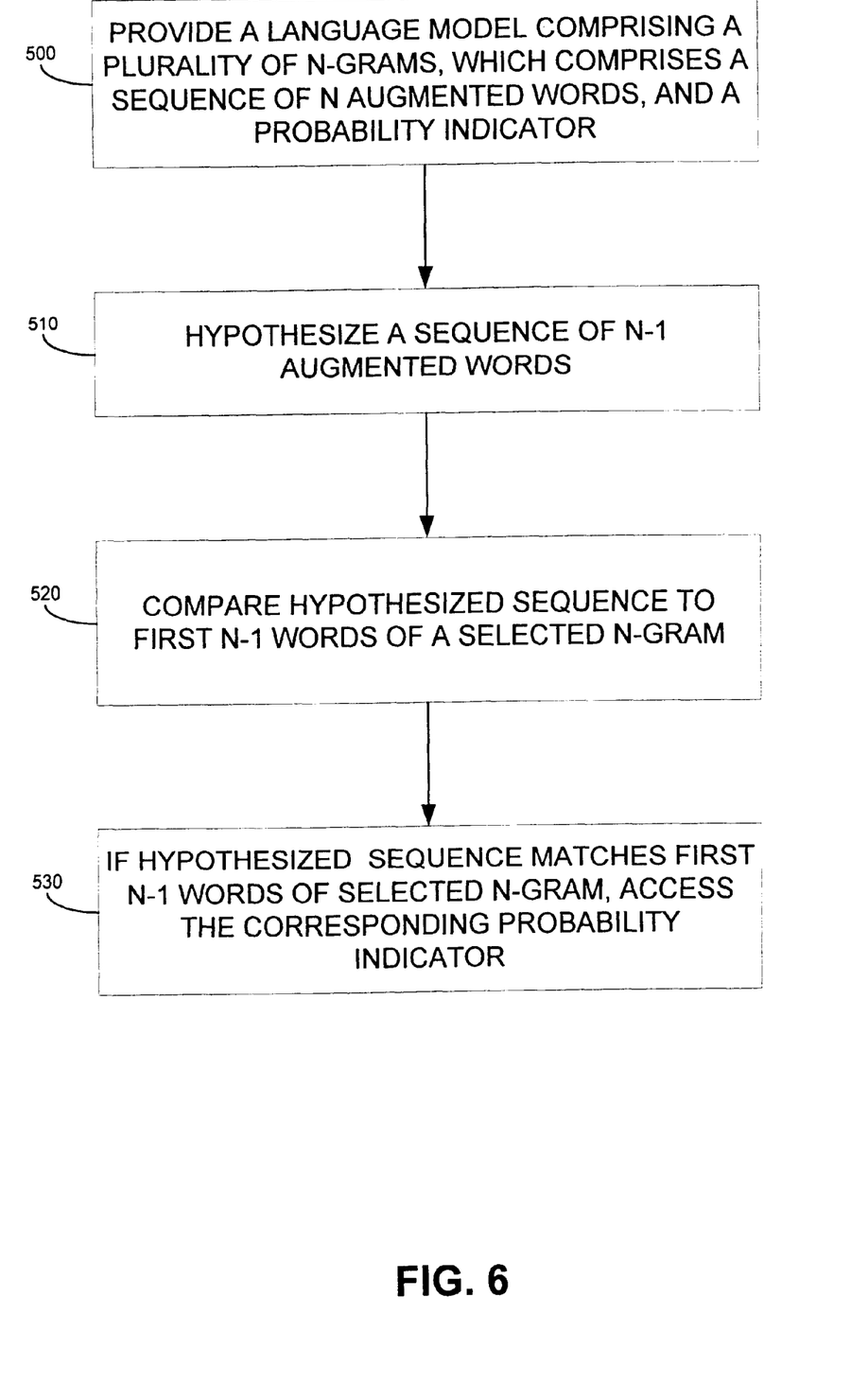
FIG. 6 is a flow chart representing a method of automatically recognizing speech according to an illustrative embodiment of the present invention.

FIG. 6 is a flow chart representing a method of automatically recognizing speech according to an illustrative embodiment of the present invention. At step 500, a language model 108 having a plurality of n-grams is provided. Each n-gram includes a sequence of n augmented words. Each augmented word includes a word and a tag encoding lexical information regarding the word. The language model 108 further includes a probability indicator corresponding to each n-gram. Each probability indicator is indicative of a probability that, given an occurrence of the first n−1 words of the corresponding n-gram in a block of text, the immediately following word in the block of text will be the nth word of the n-gram. At step 510, a sequence (one of many) of n−1 augmented words is hypothesized. At step 520, the frontier of the hypothesized sequence is compared to the first n−1 augmented words of a selected n-gram. At step 530, if the frontier of the hypothesized sequence matches the first n−1 augmented words of the selected n-gram, the probability indicator corresponding to the selected n-gram is accessed to determine the probability that the word immediately following the hypothesized sequence will be the nth augmented word of the selected n-gram.

In an illustrative embodiment, comparing step 520 and accessing step 530 are repeated for a plurality of selected n-grams. The determined probabilities are used to determine how likely each augmented word is to follow the hypothesized sequence. In one embodiment, the probability indicators corresponding to the plurality of selected n-grams are compared to determine the probability of a new hypothesis formed by extending the old hypothesis by the augmented word in question, among the respective $n_{th}$ augmented words of the selected n-grams. Illustratively, each augmented word that is determined to be likely to follow the hypothesized sequence is combined with the hypothesized sequence to form a new hypothesis sequence. Comparing step 520 and accessing step 530 are then performed for these new sequences.

In summary, one embodiment of the present invention is directed to a computer-readable medium 108 having stored thereon a data structure that includes a first data field, optional previous-augmented word data field(s), and a probability data field. The first data field contains data representing a first augmented word and includes an orthography subfield and a tag subfield. The orthography subfield contains data representing the orthographic representation of the word. The tag subfield contains data representing a tag that encodes lexical information regarding the word. Each of any previous-augmented word data fields contains data representing a potentially preceding word and includes an orthography subfield and a tag subfield. The orthography subfield contains data representing the orthographic representation of the word. The tag subfield contains data representing a tag that encodes lexical information regarding the word. The probability data field contains data representing the probability of the first word occurring (possibly after any preceding word(s)) in a word sequence.

Another embodiment of the present invention is directed to a method of building a language model. Pursuant to this embodiment, a training corpus 300 comprising a body of text is received. Words in the training corpus 300 are augmented with a tag encoding lexical information regarding the corresponding word. A plurality of sequences of n augmented words are selected, n being a positive integer. Each selected sequence includes a sub-sequence made up of the first n−1 augmented words of the selected sequence. For each selected sequence of n augmented words, the probability that, given an occurrence of the sub-sequence in a block of text or a hypothesized augmented word sequence in a speech recognizer, the immediately following augmented word will be the nth augmented word of the selected sequence is determined.

Another embodiment of the invention is directed to a method of automatically recognizing speech. Pursuant to this embodiment, a language model 108 having a plurality of n-grams is provided. Each n-gram includes a sequence of n augmented words. Each augmented word includes a word and a tag encoding lexical information regarding the word. The language model 108 further includes a probability indicator corresponding to each n-gram. Each probability indicator is indicative of a probability that, given an occurrence of the first n−1 words of the corresponding n-gram in a block of text or in a hypothesized word sequence in a speech recognizer, the immediately following word in the block of text will be the nth word of the n-gram. A sequence of n−1 augmented words is hypothesized. The hypothesized sequence is compared to the first n−1 augmented words of a selected n-gram. If the hypothesized sequence matches the first n−1 augmented words of the selected n-gram, the probability indicator corresponding to the selected n-gram is accessed to determine the probability that the word immediately following the hypothesized sequence in a block of text will be the nth augmented word of the selected n-gram.

Another embodiment of the present invention is directed to a speech recognition system 100 that includes a computer readable storage medium 108, having data representing a language model stored thereon, and a decoder 104. The language model 108 includes a plurality of n-grams made up of a sequence of n augmented words. Each augmented word includes a word and a tag encoding lexical information regarding the word. The language model 108 further includes a probability indicator corresponding to each n-gram. Each probability indicator is indicative of a probability that, given an occurrence of the first n−1 augmented words of the corresponding n-gram in a block of text, the immediately following word in the block of text will be the nth augmented word of the n-gram. The decoder 104 is adapted to hypothesize a sequence of n−1 augmented words. The decoder 104 is further adapted to access the storage medium and to compare the hypothesized sequence to the first n−1 augmented words of a selected n-gram. If the hypothesized sequence matches the first n−1 words of a selected n-gram, the probability indicator corresponding to the selected n-gram is accessed to determine the probability that the word immediately following the hypothesized sequence will be the nth augmented word of the selected n-gram.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, although acoustic model 106 and language model 108 are shown in FIG. 2 to be external to decoder 104, they may also be incorporated within decoder 104 without departing from the scope and spirit of the present invention. Also, although the language model of the present invention is described with reference to speech recognition systems, the language model may also be employed to similar effect in other word-oriented pattern recognition systems, such as handwriting recognition and spelling correction systems. Other modifications can also be made.

What is claimed is:

1. A computer-readable medium having stored thereon a data structure comprising:
   a first data field containing data representing a first word and comprising an orthography subfield containing data representing an orthographic representation of the first word and a tag subfield containing data representing a tag, the tag encoding lexical information regarding the first word; and
   a probability data field containing data representing the probability of the first word occurring in a word sequence.

2. The computer-readable medium of claim 1 further comprising at least one previous-word data field, each containing data representing a potentially preceding word and comprising an orthography subfield containing data representing an orthographic representation of the potentially preceding word and a preceding word tag subfield containing data representing a preceding word tag, the preceding word tag encoding lexical information regarding the potentially preceding word, and wherein the probability data field contains data representing the probability of the first word occurring after the potentially preceding word in a word sequence.

3. The computer-readable medium of claim 1 wherein the tag contains syntactic information regarding the first word.

4. The computer-readable medium of claim 3 wherein the syntactic information contained by the tag includes information regarding the part of speech of the first word.

5. The computer-readable medium of claim 1 wherein the tag contains semantic information regarding the first word.

6. A method of building a language model comprising:
   receiving a training corpus comprising a body of text;
   augmenting words in the training corpus with a tag encoding lexical information regarding the corresponding word;
   selecting a plurality of sequences of n augmented words, n being a positive integer, each selected sequence including a sub-sequence made up of a first n−1 augmented words of the selected sequence; and
   for each selected sequence of n augmented words, calculating a probability that, given an occurrences of the sub-sequence in a block of text, an immediately following word will be the $n^{th}$ augmented word of the selected sequence.

7. The method of building a language model of claim 6, further comprising steps of:
   storing each selected sequence of n augmented words; and
   storing the calculated probability corresponding to each selected sequence.

8. The method of building a language model of claim 7 wherein the syntactic information contained by the tags includes information regarding a part of speech of the corresponding word.

9. The method of building a language model of claim 6 wherein the tags contain syntactic information regarding the corresponding word.

10. The method of building a language model of claim 6 wherein the tags contain semantic information regarding the corresponding word.

11. The method of building a language model of claim 6 wherein calculating the probability comprises:
   determining a number of times the selected sequence occurs in the training corpus;
   determining a number of times that the sub-sequence occurs in the training corpus; and
   calculating a probability that, given an occurrence of the sub-sequence in a block of text, the immediately following word will be the $n^{th}$ augmented word of the selected sequence.

12. A language model, comprising:
   a plurality of word fields, each word field including an orthographic subfield that includes an orthographic representation of an associated word, a lexical subfield that includes lexical information corresponding to the associated word, and a probability subfield including probability information indicative of a probability that the associated word occurs with the lexical information.

13. The language model of claim 12 wherein the lexical information is encoded in a tag in the lexical subfield.

14. The language model of claim 12 wherein each word field further comprises:

a preceding word field indicative of a potentially preceding word, the preceding word field including a preceding orthographic subfield including an orthographic representation of the potentially preceding word and a preceding lexical subfield including lexical information corresponding to the potentially preceding word.

15. The language model of claim 14 wherein the probability subfield includes probability information indicative of a probability of the word associated with the word field having the lexical information in the lexical subfield and following the potentially preceding word with the lexical information in the preceding lexical subfield.

* * * * *